United States Patent [19]

Kawazoe

[11] Patent Number: 5,044,261
[45] Date of Patent: Sep. 3, 1991

[54] COFFEE BREWING APPARATUS

[75] Inventor: Takemitsu Kawazoe, Tokyo, Japan

[73] Assignee: U.S. Philips Corporation, Tarrytown, N.Y.

[21] Appl. No.: 413,350

[22] Filed: Sep. 27, 1989

[30] Foreign Application Priority Data

Oct. 6, 1988 [JP] Japan .................. 63-252298

[51] Int. Cl.⁵ .................... A47J 31/42
[52] U.S. Cl. .................... 99/280; 99/286; 392/498; 219/483
[58] Field of Search ......... 99/279, 280, 281, 282, 99/283, 286, 293, 295, 299, 300; 219/328, 327, 483

[56] References Cited

U.S. PATENT DOCUMENTS 4,412,481 11/1983 Oota ...................... 99/281
4,511,790 4/1985 Kozak .................... 219/328
4,566,802 1/1986 Koehler ................. 99/281

FOREIGN PATENT DOCUMENTS 61-5215 2/1986 Japan .

Primary Examiner—Robert W. Jenkins
Attorney, Agent, or Firm—Ernestine C. Bartlett

[57] ABSTRACT

A power switch (2) of a coffee brewing machine comprises a button (3) for manually switching on and off the brewing machine. The switch (2) further comprises detection means (24) for switching off the brewing machine in case an abnormal situation is detected, for example, when a predetermined period of time has elapsed.

11 Claims, 3 Drawing Sheets

COFFEE BREWING APPARATUS

BACKGROUND OF THE INVENTION

The present invention relates to a coffee brewing apparatus comprising a filter chamber for brewing coffee, a water tank, a heater for heating water delivered from the water tank and providing hot water to the filter chamber, and a power switch.

A coffee brewing apparatus provided with a mill to grind coffee beans is known, and that kind of apparatus with a timer is disclosed in Japanese Utility Model Publication No. 61-5215. The operation of this apparatus will be explained with reference to FIG. 3.

The current time and desired activation time are set by means of a fast-traverse button 34 or a slow-traverse button 35 together with a time setting button 36. Then, when a main switch 37 is toggled from "OFF" position to "TIMER" position, the coffee brewing apparatus gets into the timer mode. If a mill switch is depressed during the timer mode, mill 28 is energized causing coffee beans to be ground resulting in coffee powder. When the current time coincides with the activation time, power is supplied to a heater and water contained in water tank 27 is heated. Coffee beverage is brewed by transmitting hot water through the coffee powder ground by mill 28. The brewed coffee is poured into the coffee vessel 31 from upper protrusion 29. Then, a heating plate contained in base 30 keeps the coffee warm.

However, the coffee taste deteriorates due to oxidization if the coffee is warmed for a long time. Therefore, the known coffee brewing apparatus automatically ceases to supply power to the heating plate following the operation of the timer of the apparatus if a predetermined time (59 minutes) lapses after brewing.

The main switch employed in the known coffee brewing apparatus is a dual three-contact switch which can take three positions: "TIMER", "OFF" or "ON". While the switch is in the "ON" position, power is always supplied to the heater. If the switch is turned to the "OFF" position, the power source is switched off.

In addition to this kind of a dual three-contact switch, a tumbler switch, a push-button switch or a switch having a timer function realized by a spiral spring, are conventionally utilized as a power switch of the coffee brewing apparatus. However, in case such a switch is employed the power source has to be turned off by hand.

Generally, a thermostat is arranged between the heater and the power lines in order to keep the heater temperature within a limited range. The circuit is turned on by this thermostat if the temperature falls below a preselected temperature, for example 90° C., and is turned off if it rises above another preselected temperature, for example 120° C. Furthermore, the coffee brewing apparatus is generally provided with a thermal fuse near the heater in order to prevent the situation in which the thermostat does not turn off the heater even if the temperature rises above the preselected maximum temperature and the heater continues to be heated.

In the coffee brewing apparatus shown in the above-mentioned Utility Model Publication No. 61-5215, the power to the heater is automatically cut-off by a timer after a predetermined time elapses. In a conventional coffee brewing apparatus, when a heating plate is heated excessively, the melting of a thermal fuse cuts-off the power supply to the heater. However, in the case of the known apparatus, power continues to be supplied to the electric portion of the apparatus other than the heater portion so that the electrical portion still might cause a fire. Therefore, in the known coffee brewing apparatus, each time that power is no longer supplied to the heater, or each time that an abnormal situation happens, the user must turn off the power switch manually in order to remove the possibility of having a fire.

Furthermore in the known apparatus, if a motor is heated abnormally or excessively due to overload and the operator does not recognize the abnormal situation, the motor will be burned out.

SUMMARY OF THE INVENTION

One of the objects of the present invention is to provide a coffee brewing apparatus having a greater safety than a conventional apparatus. The invention solves the above-mentioned problems of the prior art by providing a coffee brewing apparatus that is characterized in that the power switch has a switch function by which an "on"-state and an "off"-state are alternately selected in response to a manual operation of said power switch and comprising further means to release said "on"-state in response to a releasing signal. When a motor or a heater in the coffee brewing apparatus becomes abnormal, or when it is unnecessary to supply power to a heating plate when a definite time has elapsed after finishing the brewing, the releasing signal from the electronic circuit automatically cuts off the whole apparatus.

DETAILED DESCRIPTION OF THE PREFERRED EMBODIMENTS

Figure 1:
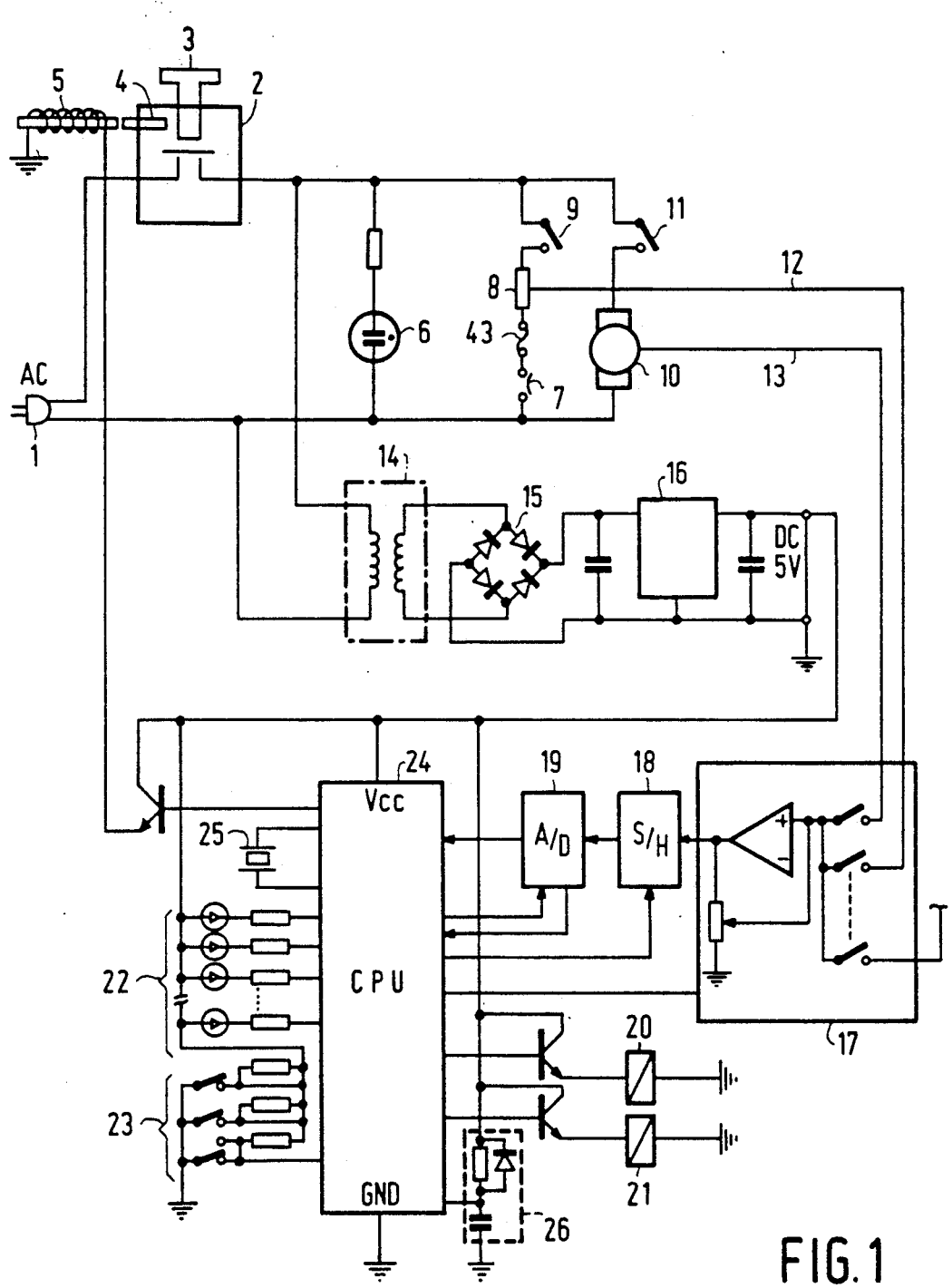
FIG. 1 shows a first working example of the present invention, a circuit diagram of a coffee brewing apparatus with a mill.

The first working example of the invention exemplified on a coffee brewing apparatus with a mill will be explained with reference to FIG. 1.

The coffee brewing apparatus comprises the same filter chamber, water tank and hot water providing apparatus as the known one.

The series combination of a resister and an indicator lamp 6 for signaling that the power is on, the series combination of a thermostat 7, a thermal fuse 43, a heater 8, for example combined with a heating plate and relay contacts 9 for the heater, and the series combination of a motor 10 and relay contacts 11 for the motor, are connected in parallel to the power lines leading from power introduction plug 1. A power switch 2 is arranged in one or both of the power lines.

In the same way as a conventional push-button switch, the power switch 2 alternates between the locked states "ON" and "OFF" each time that switching button 3 is depressed. If a releasing signal is applied, solenoid 5 is excited and moves the "on"-state releasing lever 4. In this way the locked "on"-state of switch 2 is released, and the switch 2 switches to its "off"-state.

In addition, transformer 14, rectifying diodes 15 and three-terminal regulator 16 are also connected to the power lines. This circuit configuration generates a 5 volt direct voltage which is supplied to the power source terminal of a microprocessor 24.

A signal line 12 from a temperature sensor (not shown) such as a thermistor provided near the heater 5 and heating plate 8, and a signal line 13 from another temperature sensor (not shown), provided near the motor 10 are connected to a multiplexer 17.

The output of the multiplexer 17 is applied to the microprocessor 24 via a sampling-hold circuit 18 and an analog-do-digital converter 19.

A relay 20 for the motor and a relay 21 for the heater are connected, through transistors, to a direct voltage source of 5V and also microprocessor 24.

Furthermore, the microprocessor 24 is connected with the LED group 22 to indicate the system state, to the input buttons 23 for directing the coffee brewing apparatus and to the quartz oscillator 25 for clock pulses. The microprocessor may be reset by means of a circuit 26 when the power is switched on.

Now, the operation of the first working example of the coffee brewing apparatus with a coffee mill according to the invention will be explained.

If heater 8 with combined heating plate is overheated due to the breakdown, for example, of the thermostat, the thermistor arranged near the heater 8 detects the overheating and then generates a signal. The signal indicating the abnormal state is transmitted to microprocessor 24 via signal line 12. In response to the signal, microprocessor 24 sends a pulse signal for releasing the "on"-state via a transistor, to the solenoid 5 of power switch 2. In response to the pulse signal, solenoid 5 is excited and moves the "on"-state releasing lever 4. Thus the locked "on"-state of power switch 2 is released and all parts of the coffee brewing apparatus are turned off from the power source.

In a second mode of operation of the safety switch, if motor 10 is overheated during coffee beans being ground, a signal to indicate the abnormal condition is sent to microprocessor 24 via the signal line 13 from the thermistor arranged near motor 10. Depending on this signal. microprocessor 24 transmits a releasing signal to power switch 2 to switch off the coffee brewing apparatus.

When the brewing has finished, the brewed coffee is kept warm by the heating plate for a predetermined period of time. When this time period has elapsed, microprocessor 24 sends a releasing signal to power switch 2 in order to prevent degrading of the coffee taste. Thus the coffee brewing apparatus is turned off completely and the keep-hot process for coffee finishes.

Figure 2:
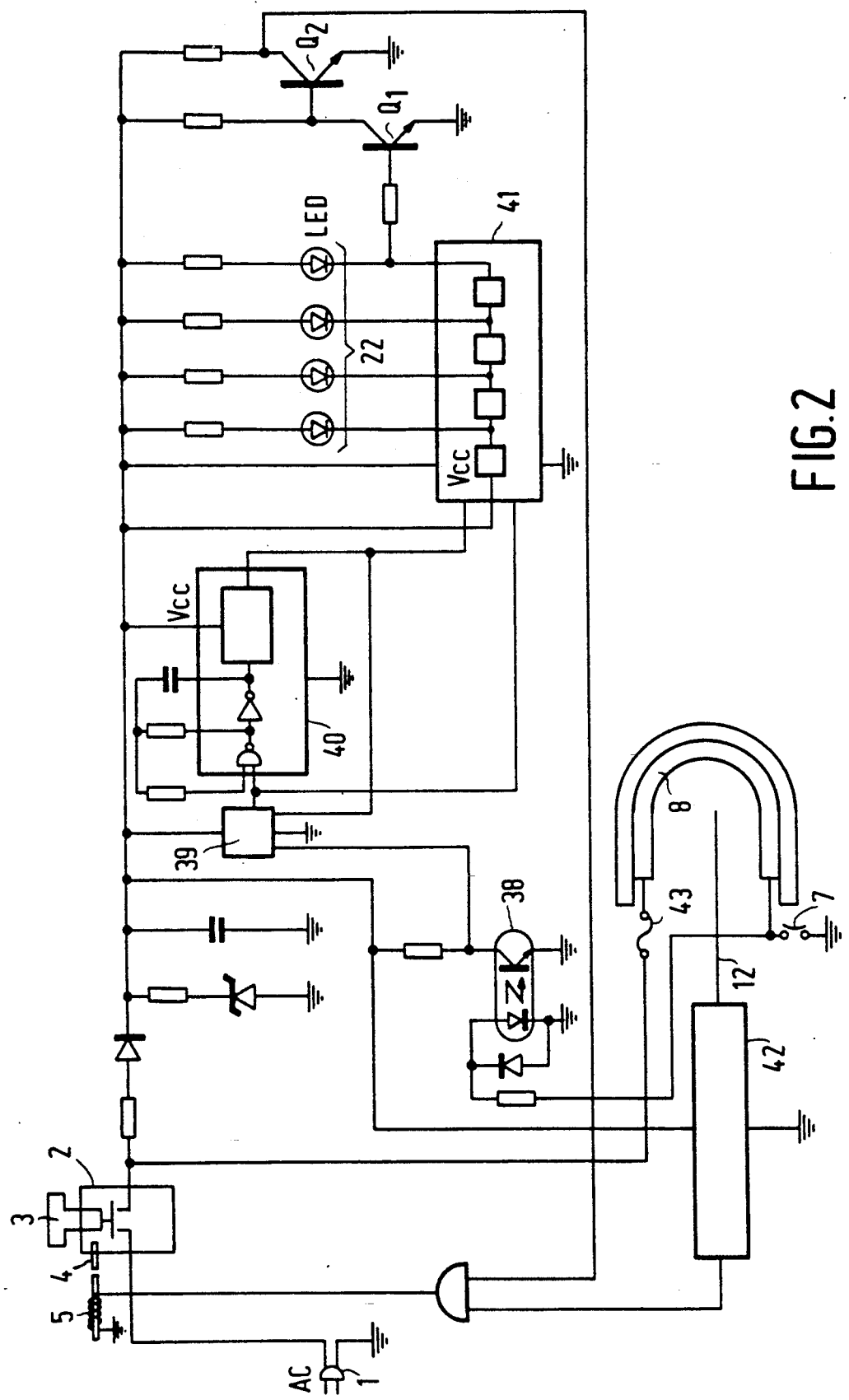
FIG. 2 shows a circuit diagram of a coffee brewing apparatus, a second working example of the present invention.
Figure 3:
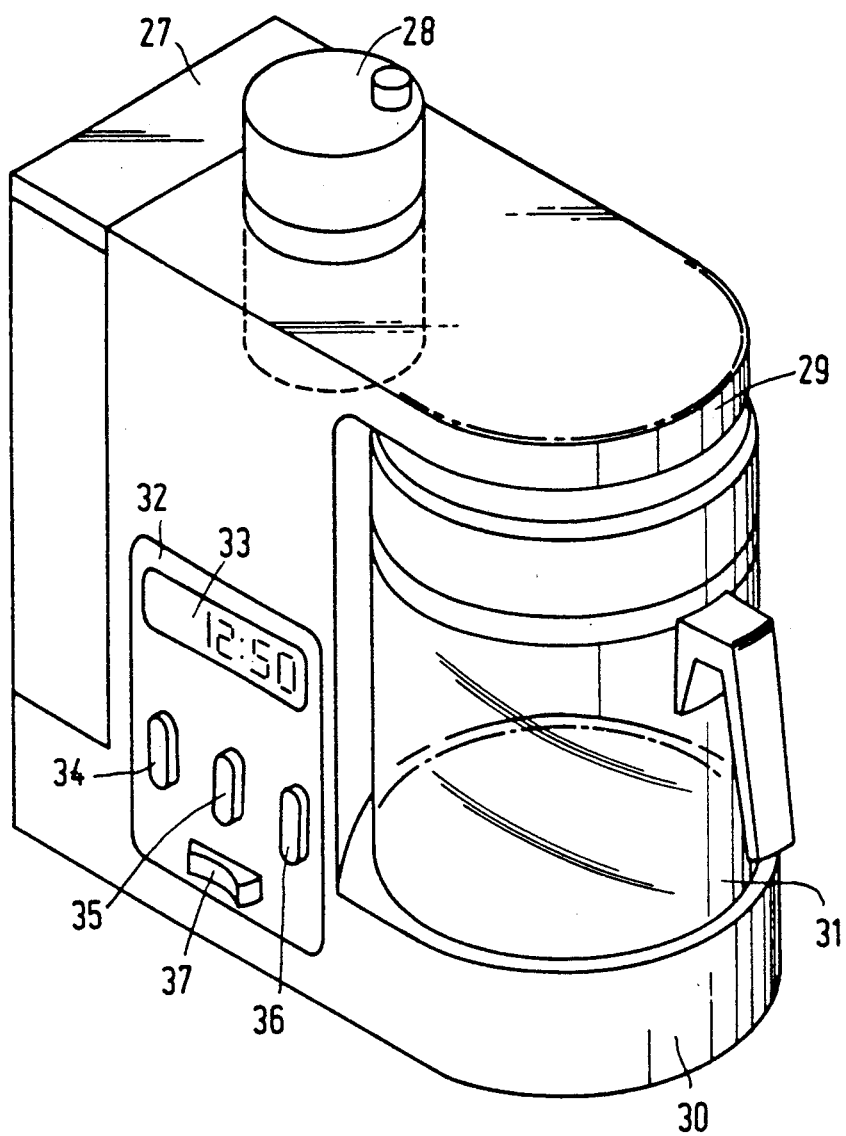
FIG. 3 is a perspective view of a known coffee brewing apparatus with a mill.

Next, referring to FIG. 2, the second working example of the present invention will be explained. The coffee brewing apparatus in this example does not comprise a coffee mill. The same function as that of the first working example is realized not by means of the microprocessor as in the first working example, which is expensive, but by means of discrete devices.

Depressing the switching button 3 of power switch 2, which is similar to that used in the first example, realizes the "on"-state. A current is provided to heater 8 via thermostat 7 to start pumping. If a predetermined amount of pumping has finished, the temperature of heater 8 rises rapidly. When it reaches the predetermined temperature, for example 115° C., thermostat 7 is turned off. Reset/timer-starting control circuit 39 detects the above state through a photo-coupler 38, and makes timer 40 start.

Timer 40 (HEF 4060) generates one pulse after every interval of, for example, 15 minutes. In response to the pulse, a shift register 41 turns off one LED of LED group 22 for each interval. In the initial state all LEDs of LED group 22 were turned on.

After a predetermined fixed period of time has elapsed, shift register 41 generates a pulse which turns off the last LED and which at the same time is sent to power switch 2 via transistors $Q_2$ and $Q_2$, causing lever 5 to be moved and switching of the apparatus.

If the heater is overheated and exceeds a predetermined temperature, for example 200° C., a signal detected by a thermistor is sent to the abnormal temperature detecting circuit 42 via signal line 12. The abnormal temperature detecting circuit 42 sends a releasing signal to power switch 2, causing the coffee brewing apparatus to be turned off.

In order to keep the coffee temperature at a desired temperature, after pumping has finished, thermostat 7 repeats on-and-off operation until the power source is switched off. Therefore, reset/timer-starting circuit 40 is arranged not to receive any signals after starting the timer by receiving the first signal from photo coupler 38.

The following effects can be expected for the coffee brewing apparatus of the invention;

(1) When the heater portion of the coffee brewing apparatus is overheated, not only the heater but also the power source itself is automatically disabled, which results in a noteworthy improved safety of the apparatus.

(2) Even if the abnormal condition occurs in the motor, the power source is switched off to cease the working of the motor, so that the motor does not burn out as does the motor in the known apparatus.

(3) When the process of keeping coffee hot finishes after a predetermined period time has elapsed, not only the heater but also any other portion is turned off, whereby the possibility of having a fire can be completely removed, and also saving of electricity can be attained.

(4) It is unnecessary to turn off the power switch manually each time that the heating process of the coffee finishes or an abnormal situation has occurred.

Legend of Reference Numbers

| Legend of reference numbers: | | | |
|---|---|---|---|
| 1 | power introduction plug, | 2 | power switch, |
| 3 | switching button, | 4 | "on"-state releasing lever, |
| 5 | solenoid, | 6 | indicator lamp, |
| 7 | thermostat, | 8 | heater, |
| 9 | relay contacts for heater, | 10 | motor, |
| 11 | relay contacts for motor, | 12, 13 | signal line, |
| 14 | transformer, | 15 | directional diode, |
| 16 | three terminal regulator, | 17 | multiplexer, |
| 18 | sampling-hold circuit, | | |
| 19 | analog-to-digital converter, | | |
| 20 | relay for the motor, | 21 | relay for the heater, |
| 22 | LED group, | 23 | key input portion, |
| 24 | microprocessor, | 25 | quartz oscillator, |
| 26 | reset circuit, | 27 | water tank, |
| 28 | mill, | 29 | upper protrusion, |
| 30 | base, | 31 | coffee reservoir, |
| 32 | operation portion, | 33 | time indicator portion, |
| 34 | fast-traverse button, | 35 | slow-traverse button, |
| 36 | time setting button, | 37 | main switch, |
| 38 | photo-coupler, | | |
| 39 | reset/timer-starting control circuit, | | |

-continued

Legend of reference numbers:

| 40 | timer, | 41 | shift register, |
|---|---|---|---|
| 42 | abnormal temperature detecting circuit | | |

I claim:

1. A coffee brewing apparatus comprising a filter chamber for brewing coffee, a water tank, a heater for heating water delivered from the water tank and providing hot water to the filter chamber, detecting means for detecting an abnormal situation, and a power switch wherein the power switch has a switch function by which an "on"-state and an "off"-state are alternately selected in response to a manual operation of said power switch and comprising further means to release said "on"-state in response to a releasing signal, said releasing signal being a signal generated by said detecting means in response to a detected abnormal situation.

2. A coffee brewing apparatus as claimed in claim 1 wherein the coffee brewing apparatus comprises a coffee mill.

3. A coffee brewing apparatus comprising a filter chamber for brewing coffee, a water tank, a heater for heating water delivered from the water tank and providing hot water to the filter chamber, detecting means for detecting an abnormal situation, and a power switch wherein the power switch has a switch function by which an "on"-state and an "off"-state are alternately selected in response to a manual operation of said power switch and comprising further means to release said "on"-state in response to a releasing signal, said releasing signal being a signal generated when a predetermined fixed period of time has elapsed.

4. A coffee brewing apparatus as claimed in claim 3 wherein the coffee brewing apparatus comprises a coffee mill.

5. A coffee brewing apparatus comprising a filter chamber for brewing coffee, water tank, a heater for heating water delivered from the water tank and providing hot water to the filter chamber, detecting means for detecting an abnormal situation, and a power switch wherein the power switch has a switch function by which an "on"-state and an "off"-state are alternately selected in response to a manual operation of said power switch and comprising further means to release said "on"-state in response to a releasing signal, said releasing signal comprising a signal generated by said detecting means and a signal generated when a predetermined fixed period of time has elapsed.

6. A coffee brewing apparatus as claimed in claim 5 wherein the coffee brewing apparatus comprises a coffee mill.

7. A coffee brewing apparatus comprising a filter chamber for brewing coffee, a water tank, a heater for heating water delivered from the water tank and providing hot water to the filter chamber, a power switch having switching contacts arranged in circuit of at least one mains supply power line of the coffee brewing apparatus, said power switch having a switch function by which an "on"-state and an "off"-state are alternately selected in response to a manual operation of said power switch, detecting means for detecting an abnormal situation and means to release said "on"-state in response to a releasing signal, the releasing signal being a signal generated by said detecting means in response to a detected abnormal situation.

8. A coffee brewing apparatus as claimed in claim 7 wherein the releasing signal is a signal generated when a predetermined fixed period of time has elapsed.

9. A coffee brewing apparatus as claimed in claim 7 wherein the coffee brewing apparatus comprises a coffee mill.

10. A coffee brewing apparatus comprising a filter chamber for brewing coffee, a water tank, a heater for heating water delivered from the water tank and providing hot water to the filter chamber, a power switch having switching contacts arranged in circuit of at least one mains supply power line of the coffee brewing apparatus, said power switch having a switch function by which an "on"-state and an "off"-state are alternately selected in response to manual operation of said power switch, detecting means for detecting an abnormal situation, and means to release said "on"-state in response to a releasing signal, the releasing signal comprising a signal generated by said detecting means and one generated when a predetermined fixed period of time has elapsed.

11. A coffee brewing apparatus as claimed in claim 10 wherein the coffee brewing apparatus comprises a coffee mill.

* * * * *